(12) United States Patent
Panizzolo

(10) Patent No.: US 6,523,844 B2
(45) Date of Patent: Feb. 25, 2003

(54) SUSPENDED AXLE OF THE ARTICULATED-CONNECTION TYPE FOR INDUSTRIAL VEHICLES

(75) Inventor: Fabrizio Panizzolo, Padua (IT)

(73) Assignee: Dana Italia S.p.A., Arco (IT)

( * ) Notice: Subject to any disclaimer, the term of this patent is extended or adjusted under 35 U.S.C. 154(b) by 42 days.

(21) Appl. No.: 09/772,339

(22) Filed: Jan. 29, 2001

(65) Prior Publication Data

US 2002/0101052 A1 Aug. 1, 2002

(51) Int. Cl.[7] ................................................. B60G 9/02
(52) U.S. Cl. ...................... 280/124.111; 280/124.116; 280/124.156; 180/378
(58) Field of Search .................. 280/124.11, 124.116, 280/124.111, 124.112, 124.113, 124.114, 124.156, 124.107; 180/349, 352, 378

(56) References Cited

U.S. PATENT DOCUMENTS

| | | | | |
|---|---|---|---|---|
| 3,976,302 A | * | 8/1976 | Hammarstrand | 180/41 |
| 4,826,203 A | * | 5/1989 | Kijima et al. | 280/124.109 |
| 5,447,320 A | * | 9/1995 | Hurlburt | 180/266 |
| 5,447,321 A | * | 9/1995 | Hurlburt et al. | 180/266 |
| 5,476,150 A | * | 12/1995 | Hurlburt et al. | 172/279 |
| 5,476,276 A | * | 12/1995 | Hurlburt | 180/266 |
| 5,879,016 A | * | 3/1999 | Altherr et al. | 280/124.112 |

FOREIGN PATENT DOCUMENTS

| | | | |
|---|---|---|---|
| DE | 38 34 693 A1 | * | 6/1989 |
| DE | 196 04 635 A1 | | 8/1997 |
| EP | 0 499 887 A1 | * | 8/1992 |
| EP | 0 890 462 A1 | | 1/1999 |
| EP | 1 046 520 A2 | | 10/2000 |
| EP | 1 108 569 A2 | | 6/2001 |
| JP | 64-67481 | | 3/1989 |

* cited by examiner

Primary Examiner—Paul N. Dickson
Assistant Examiner—David R. Dunn
(74) Attorney, Agent, or Firm—Hedman & Costigan, P.C.

(57) ABSTRACT

A suspended axle (31) of the articulated-connection type for industrial vehicles comprises a central casing (32) from which two arms (34) extend, each of which carries, at one of its ends, a support (36) for a wheel, the axle (31) being connected to the chassis (52) of the industrial vehicle by means of first bars set transversely and second bars set longitudinally with respect to the vehicle, where the transverse bars comprise a Panhard rod (54). In addition, interposed between the axle (31) and the chassis (52) are hydraulic elements (84). The longitudinal bars each consist of a single strut (64) having one end connected to the central casing (32) and one, opposite, end connected to the chassis (52) with interposition of a ball-and-socket joint (68).

13 Claims, 7 Drawing Sheets

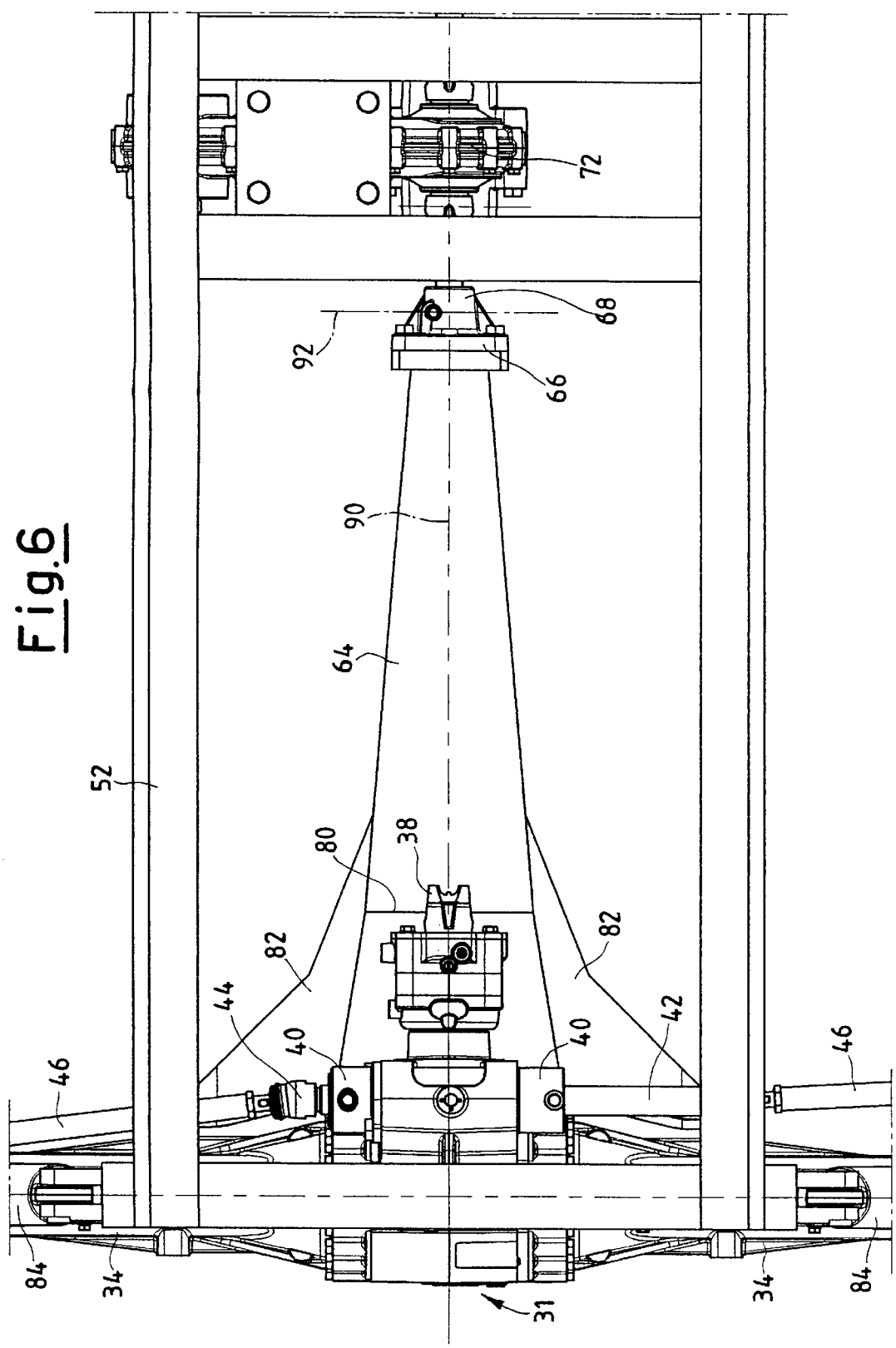

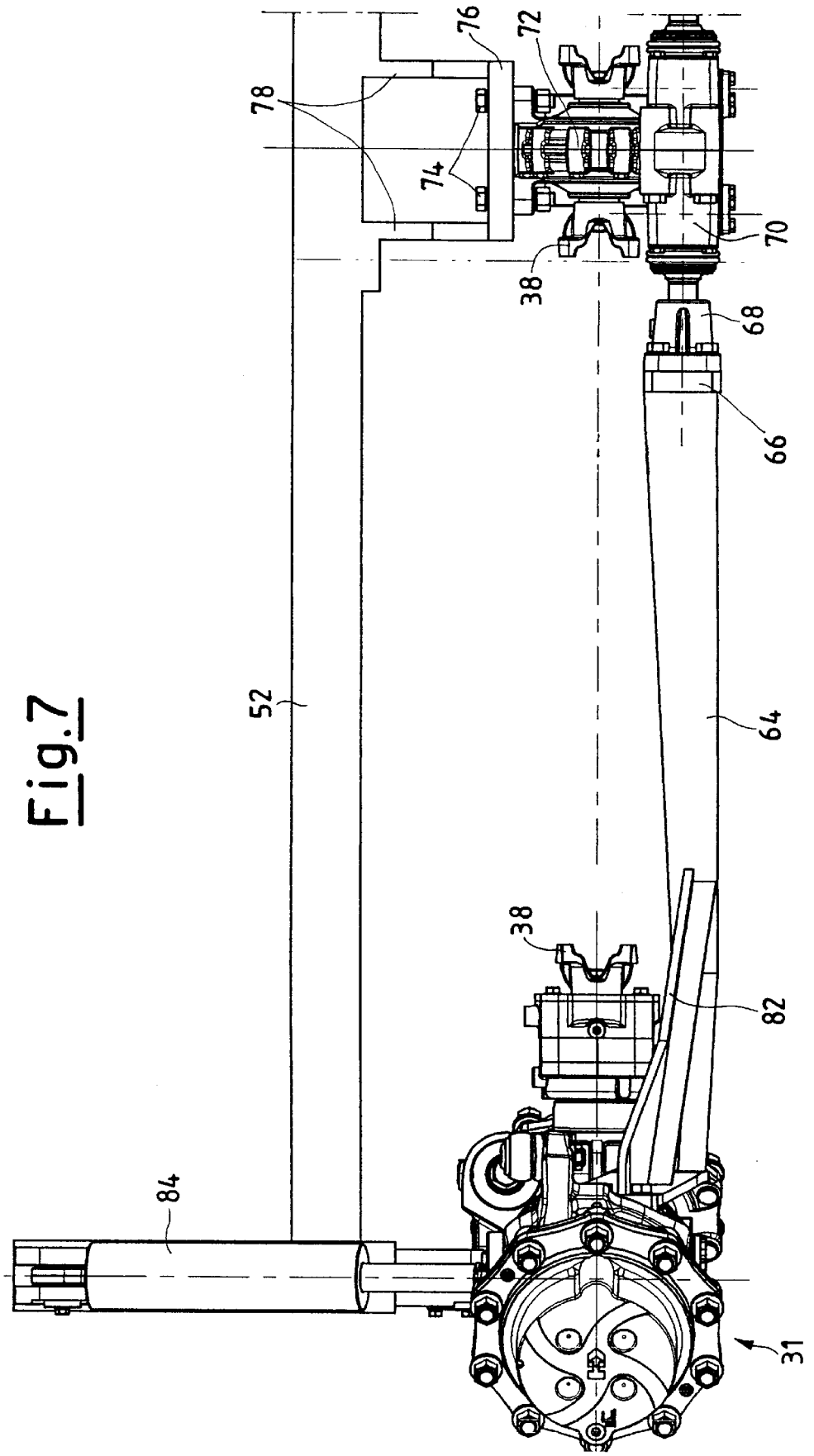

SUSPENDED AXLE OF THE ARTICULATED-CONNECTION TYPE FOR INDUSTRIAL VEHICLES

BACKGROUND OF THE INVENTION

The present invention refers to a suspended axle of the articulated-connection type for industrial vehicles.

The axle according to the present invention is in particular designed to be mounted on industrial vehicles, such as telescopic lifting trucks, mechanical shovels, combined earth movers or bachoe-loaders, graders, tractors and the like.

For the purpose of rendering the technical problems dealt with in the present invention evident, a typical example of a traditional suspended axle for industrial vehicles will be briefly described in what follows, with particular reference to FIG. 1.

The traditional axle 11 is made by means of a central casing 12, from which two arms 14 extend. Each arm 14 carries, at one of its ends, a support 16 for a wheel (not shown). In various embodiments, this support 16 may have a steering function, a traction function, a steering-and-traction function, or else may be idle. The axle 11 is connected to a chassis of an industrial vehicle (not shown) by means of four longitudinal bars 18 which are hinged—set two by two one above the other—on one side, to the casing 12 and, on the other side, to the vehicle chassis. In addition, hinged to the casing 12 is one end of a Panhard rod 20, which is set transversely with respect to the vehicle and has its opposite end hinged to the chassis.

Finally, between the arms 14 of the axle 11 and the chassis of the industrial vehicle are set two hydraulic elements 22 which function as shock absorbers. Usually, the elements 22 are made up of hydraulic cylinders connected to pneumatic gas-charged accumulators and are connected to a hydraulic power unit (not shown in FIG. 1 for reasons of simplicity).

Of course, all the bars 18, 20 are hinged using ball-and-socket joints in order to allow transverse and vertical oscillations of the axle 11 with respect to the chassis of the industrial vehicle.

The traditional axles described above are notoriously complex and, furthermore, are built using a very large number of elements. In particular, the connection of the axle to the chassis requires in all five bars, each of which carries two ball-and-socket joints.

SUMMARY OF THE INVENTION

A purpose of the present invention is to eliminate the technical problems referred to above by providing a suspended axle of the articulated-connection type for industrial vehicles, which is built using a limited number of elements as compared to traditional embodiments, in particular as regards its connection to the vehicle chassis.

Another purpose of the present invention is to provide an axle that may be installed underneath the vehicle chassis in a basically simple manner.

Not the least important purpose of the present invention is to provide a suspended axle of the articulated-connection type for industrial vehicles that is basically simple, safe and reliable.

These and other purposes according to the present invention are achieved by providing a suspended axle of the articulated-connection type for industrial vehicles comprising a central casing (32) from which two arms (34) extend, each of which carries, at one of its ends, a support (36) for a wheel, said axle (31) being connected to a chassis (52) of said industrial vehicle by means of a first transverse bar set transversely with respect to said vehicle and a second bar set longitudinally with respect to said vehicle, where said transverse bars comprise at least one Panhard rod (54) and where, in addition, interposed between said axle (31) and said chassis (52) are hydraulic elements (84), wherein said suspended axle (31) comprises a longitudinal connection between said chassis (52) and said longitudinal bar (64), wherein the connection end of said longitudinal bar (64) to said chassis (52) comprises an articulated joint.

Further characteristics of the present invention are moreover defined in the subsequent claims.

Advantageously, the axle according to the invention makes it possible to increase productivity and to achieve an amplification of the operating possibilities of the industrial vehicle. In fact, the axle according to the invention enables the vehicle to move about faster and with greater safety on the road when it has to be transferred to a construction site or when it travels from one construction site to another. This makes possible a reduction in idle time, thus obtaining a considerable economic return.

In addition, the vehicles that mount the axles according to the present invention prove safer and easier to drive as compared to those equipped with traditional axles. This makes possible greater driving comfort and an overall reduction in stress and fatigue for the operator of the industrial vehicle.

BRIEF DESCRIPTION OF THE DRAWINGS

Further characteristics and advantages of a suspended axle of the articulated-connection type for industrial vehicles according to the present invention will emerge more evident from the ensuing description, which is given to provide a non-limiting example, with reference to the annexed schematic drawings, in which:

FIG. 6 shows an enlarged detail of FIG. 2; and

FIG. 7 shows an enlarged detail of FIG. 3.

DETAILED DESCRIPTION OF THE INVENTION

Figure 1:
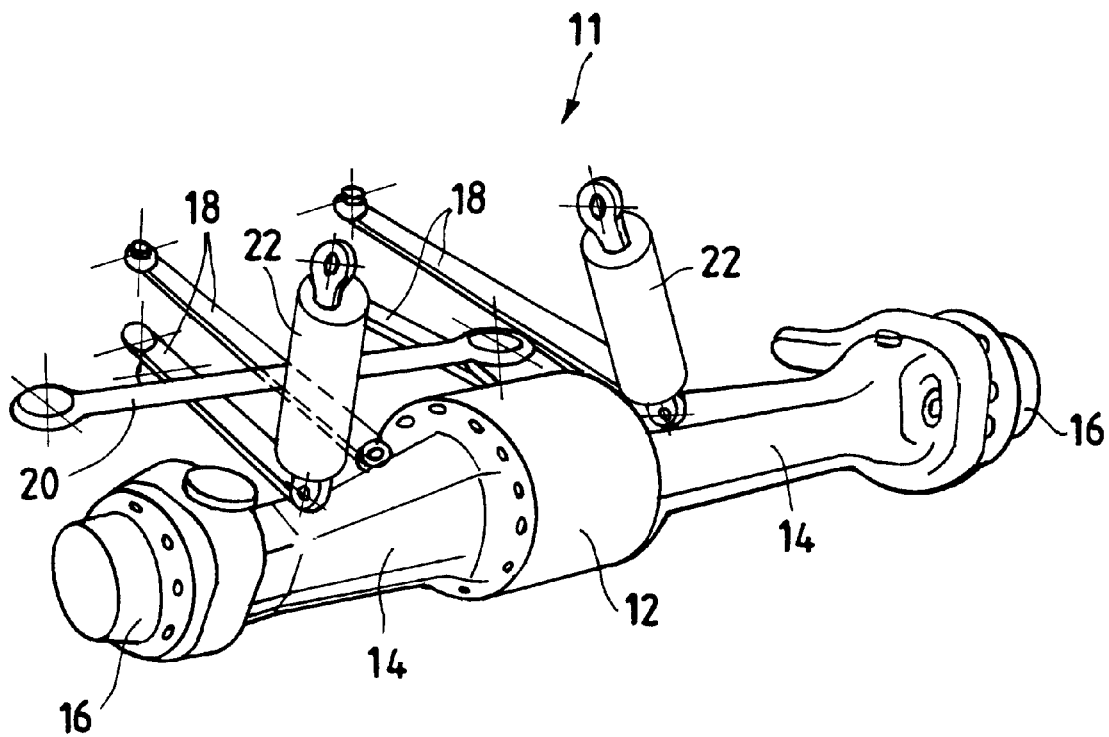
FIG. 1 shows a schematic perspective view of a suspended axle of the articulated-connection type for industrial vehicles, in a typical traditional embodiment.
Figure 2:
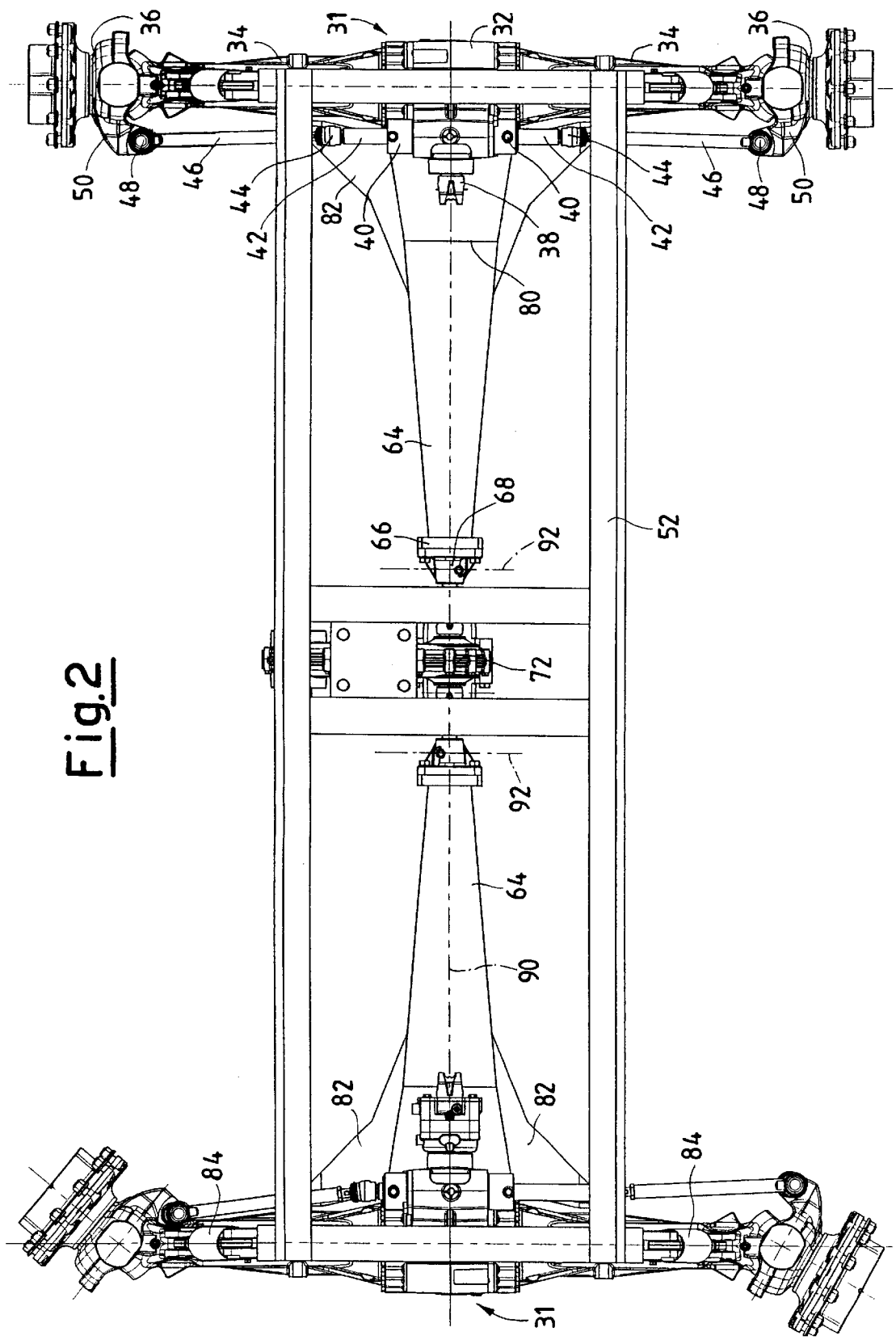
FIG. 2 shows a top plan view of a pair of axles according to the present invention, mounted on a generic chassis of an industrial vehicle.
Figure 3:
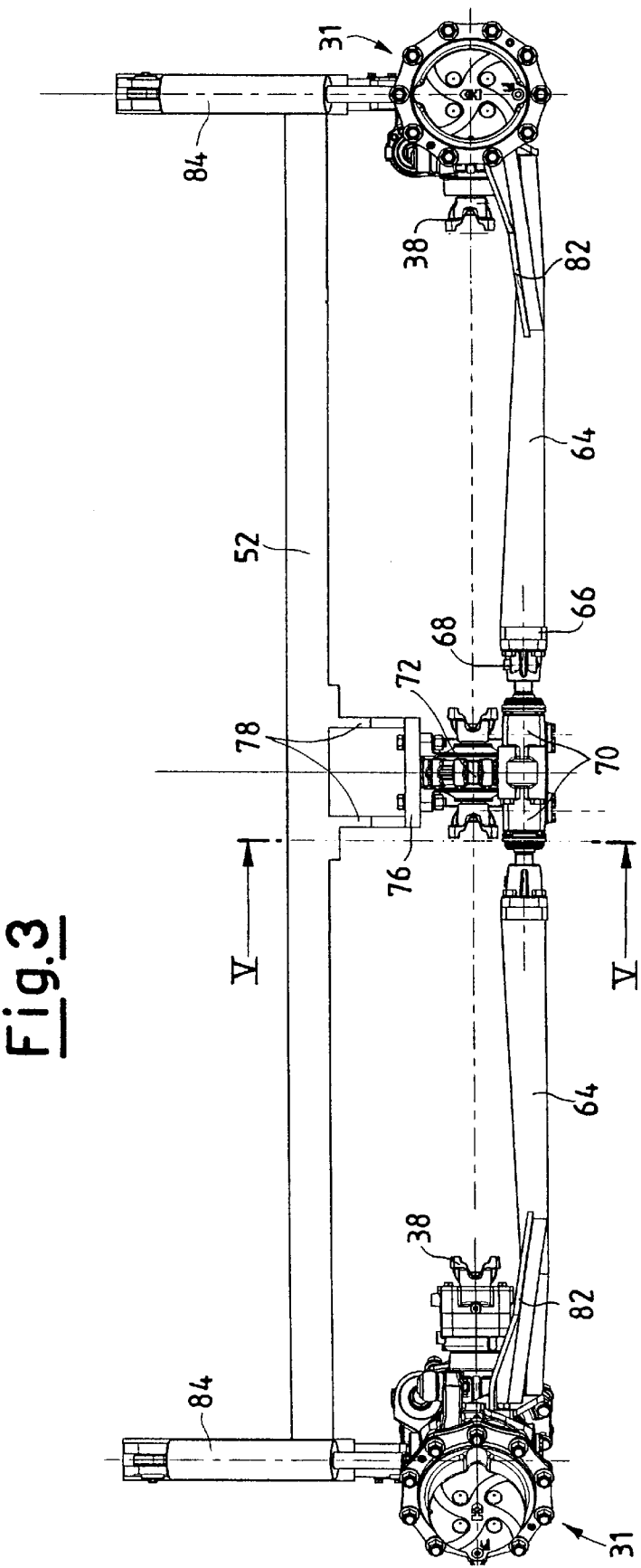
FIG. 3 is a side elevation view of the axles mounted on the chassis of the industrial vehicle as illustrated in FIG. 2.
Figure 4:
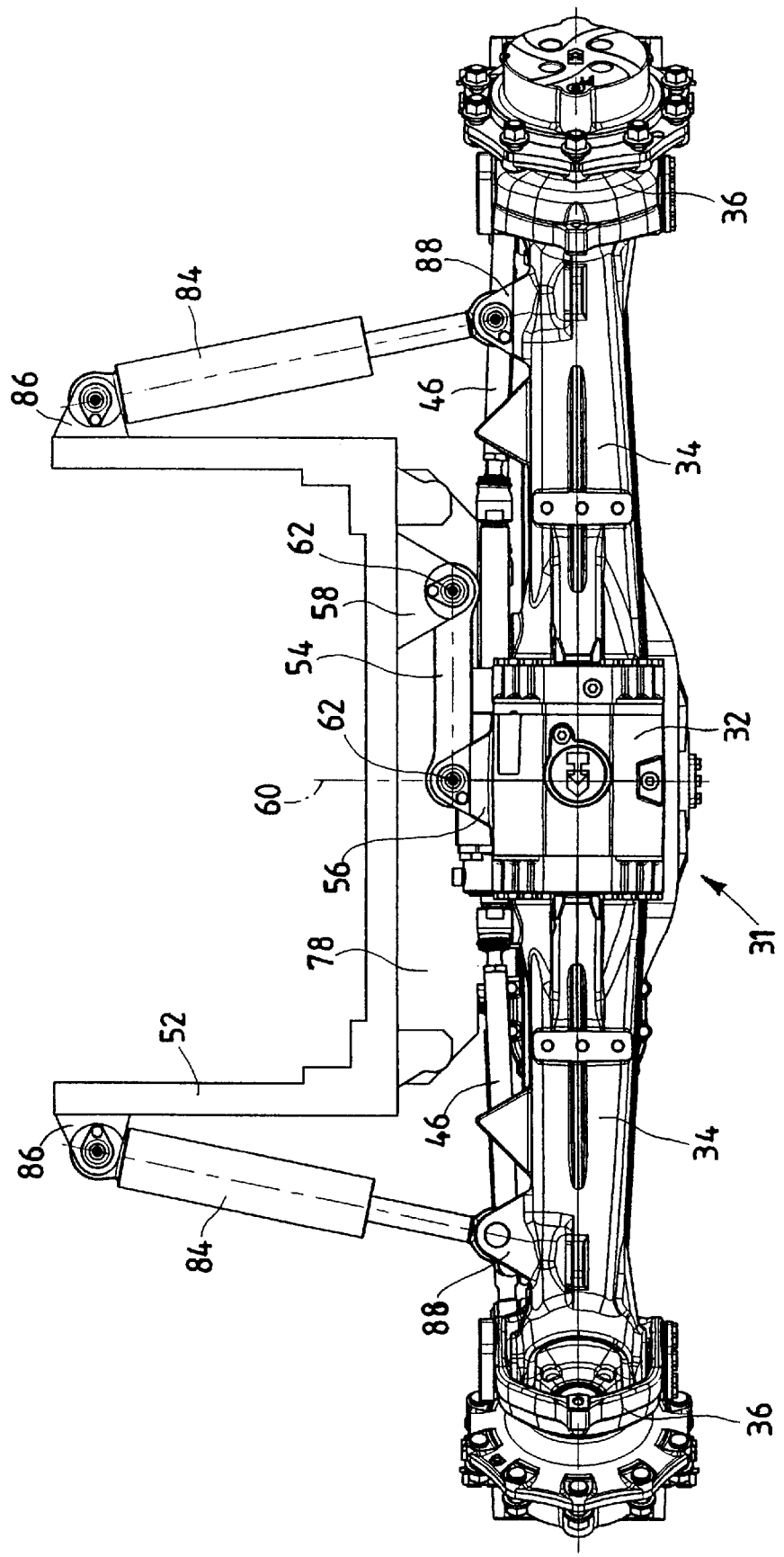
FIG. 4 is an enlarged front elevation view of the axle illustrated in FIG. 2.
Figure 5:
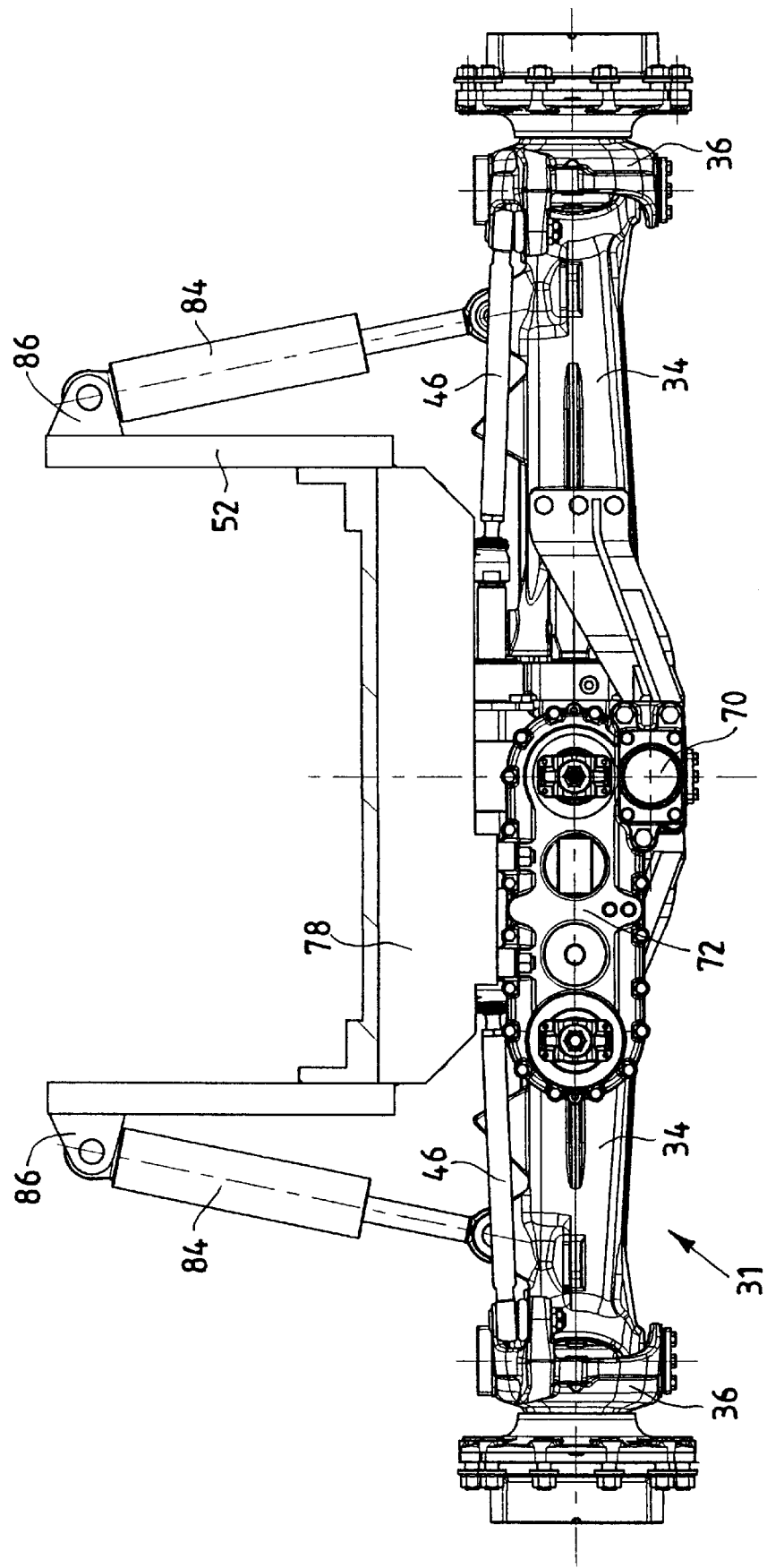
FIG. 5 shows an enlarged section taken along the line V—V of FIG. 3.

With reference to the above figures, a pair of a suspended axles of the articulated-connection type for industrial vehicles is shown, each axle being designated, as a whole, by the reference number 31.

Each axle 31 comprises a central casing 32, from which two arms 34 extend. Each of the arms 34 carries, at one of its ends, a support 36 for a wheel (not shown for reasons of simplicity).

In the present embodiment, the axles 31 illustrated are of the traction-and-steering type. In this connection, coming out of the central casing 32 is a flanged shaft 38 for connection to a driving shaft of the engine of an industrial vehicle, on which the axles 31 according to the present invention are mounted. The shaft 38 actuates a differential which, in turn, drives in rotation two axle shafts connected to rotating portions of the supports 36 (all these elements are in themselves known, and hence are not shown and are not further described in what follows).

The central casing 32 further supports a steering actuator 40, which can cause a bar 42 to slide transversely. Connected to the two opposite ends of the bar 42, by means of ball-and-socket joints 44, are first ends of bars 46. Opposite ends of the bars 46 are connected, also these by means of ball-and-socket joints 48, to appendages 50 integral with steering portions of the supports 36.

The axle 31 according to the invention is connected to a chassis 52 of the industrial vehicle by means of first bars set transversely and second bars set longitudinally with respect to the vehicle.

Each transverse bar comprises a Panhard rod 54 which is connected, on one side, to a hinge 56 that is integral with the casing 32, and, on the other side, to a further hinge 58 that is integral with the chassis 52 of the industrial vehicle.

In a preferred embodiment, the hinge 56 is fixed at a point corresponding to an axis of symmetry 60 of the axle 31, whilst the hinge 58 is fixed in the proximity of an edge of the chassis 52.

Connection between the Panhard rod 54 and the hinges 56, 58 is made by means of spherical hinges 62.

Each longitudinal bar comprises a single strut 64 that further constrains the axle 31 to the chassis 52.

The strut 64 is made by means of an elongated element which widens in the direction of the casing 32 and has a flanged end in 66 for connection, by means of a ball-and-socket joint 68, to a support 70. The support 70 is fixed underneath a box 72 of a central power divider of the industrial vehicle.

The box 72, which is set off-centre with respect to the vehicle chassis 52, is fixed by means of bolts 74 to a plate 76 which is integral with two cross members 78 of the chassis 52.

The other end of the strut 64 is bent in 80 and is rendered integral with the central casing 32 of the axle 31. Fixed along two opposite sides of the strut 64 are ribbings 82, the latter being fixed, at the front, to the arms 34 of the axle 31. The ribbings 82 have the function of stiffening the structure of the axle 31.

In addition, set between the axle 31 and the chassis 52 of the industrial vehicle are two hydraulic elements 84.

The hydraulic elements 84 preferably consist of double-acting hydraulic cylinders connected to hinges 86 integral with the chassis 52. The rods of the hydraulic cylinders are, instead, connected to hinges 88 integral with the arms 34 of the axle 31.

The hydraulic cylinders 84 are fed by an electronically controlled hydraulic power unit. This makes it possible to control the sensitivity to loading of the hydraulic elements 84, for instance to limit their range of action, as well as performing a self-levelling function for the vehicle, etc.

Operation of a suspended axle 31 of the articulated-connection type for industrial vehicles, according to the present invention, is basically as described in what follows.

Each axle 31 according to the present invention contributes to supporting the industrial vehicle, balancing in particular the transverse stresses by means of the Panhard rod 54, and the longitudinal stresses by means of the longitudinal strut 64. The vertical stresses, instead, are balanced by the hydraulic elements 84.

As a result of the stresses due, for example, to the other than perfect evenness of the ground on which the industrial vehicle is moving, the axle 31 according to the invention can oscillate about a longitudinal axis 90 which passes through the line joining the two ball-and-socket joints 68 and 62, and in addition each axle 31 can oscillate about a transverse axis 92, which also passes through the ball-and-socket joints 68.

The amount of the above oscillations is dampened by the hydraulic elements 84.

Modifications and variations are of course possible; for example, an industrial vehicle may be even provided with just one axle 31 according to the invention, whilst the other axle may be of the traditional type or, in any case, of a different type.

In addition, even though the axle 31 described herein is of the traction-and-steering type, it is clear that in a different embodiment it may be only of the steering type or only of the traction type, or else neither of the steering nor of the traction type.

In further embodiments, instead of being fixed to the power-divider box 72, the support 70 may be fixed directly to the chassis 52, for instance to one portion of the chassis which extends towards the lower part of the industrial vehicle.

In another embodiment of the axle 31 according to the present invention, the Panhard rod 54 may be made using a hydraulic cylinder with limited range of stroke. In this case, by making the stem of the piston of the Panhard rod 54 come out of its cylinder, the chassis 52 is set off-centre with respect to the axle 31. This proves useful during manoeuvring operations, for instance to enable centring of the vehicle in the working position with extreme precision and without having to move the entire vehicle.

It has been noted how a suspended axle of the articulated-connection type for industrial vehicles according to the present invention is particularly advantageous because, in addition to being simpler and more reliable as compared to traditional axles, it requires a smaller number of components than the latter.

To be added to this is the high safety and flexibility of use which it is possible to obtain, together with a markedly high productivity.

A suspended axle of the articulated-connection type for industrial vehicles, as thus conceived, may undergo further numerous modifications and variations, all falling within the scope of the present invention. In addition, all the items may be replaced with others that are technically equivalent.

In practice, the materials used, as well as the dimensions, may be any whatsoever according to the technical requirements.

What is claimed is:

1. An articulated-connection suspended axle (31) for an industrial vehicle comprising a central casing (32) from which two arms (34) extend, each of which carries, at one of its ends, a support (36) for a wheel, said axle (31) being connected to a chassis (52) of said industrial vehicle by means of first transverse bars set transversely with respect to said vehicle and second longitudinal bars (64) set longitudinally with respect to said vehicle and having ribbings on opposite sides thereof, said second longitudinal bars (64) being connected to said axle (31), said ribbings being at the end of said second longitudinal bars (64) bar adjacent to said axle (31), where said first transverse bars comprise at least one Panhard rod (54) and where, in addition, interposed between said axle (31) and said chassis (52) are hydraulic elements (84), wherein said suspended axle (31) comprises a longitudinal connection between said chassis (52) and said second longitudinal bars (64), wherein the connection end of said second longitudinal bars (64) to said chassis (52) comprises an articulated joint.

2. The axle (31) according to claim 1, wherein said articulated joint is a ball-and-socket joint (68).

3. The axle (31) according to claim 1, wherein said strut (64) is integral with said central casing (32).

4. The axle (31) according to claim 1, wherein said Panhard rod (54) is hinged, on one side, at a point corresponding to an axis of symmetry (60) of said axle (31), and on the other side, it is fixed in the proximity of an edge of said chassis (52).

5. The axle (31) according to claim 1, wherein a ball-and-socket joint (68) is fixed to a support (70), wherein said support (70) is fixed underneath a box (72) of a central power divider of said industrial vehicle.

6. The axle (31) according to claim 5, wherein said box (72) is fixed to a plate (76) integral with cross members (78) of said chassis (52).

7. The axle (31) according to claim 1, wherein a second end of said strut (64) is bent (80) and is integral with said central casing (32) of said axle (31).

8. The axle (31) according to claim 1, wherein said ribbings are fixed at the front to said arms (34) of said axle (31), said ribbings (82) performing a stiffening function for the structure of said axle (31).

9. The axle (31) according to claim 1, wherein said hydraulic elements (84) consist of double-acting hydraulic cylinders.

10. The axle (31) according to claim 9, wherein said hydraulic cylinders (84) are supplied by an electronically controlled hydraulic power unit which provides control of the sensitivity of said hydraulic cylinders to loading of a dampened element in such a way as to limit the stroke range of said hydraulic cylinders or to perform a self-leveling function for the industrial vehicle.

11. The axle (31), according to claim 1, wherein said axle is designed for steering.

12. The axle (31) according to claim 1, wherein said axle is designed for traction.

13. The axle (31) according to claim 1, wherein said Panhard rod (54) comprises a hydraulic or pneumatic cylinder having a limited stroke that causes the stem of the piston of said Panhard rod (54) to extend out of one of the cylinders and allow said chassis (52) to be offset with respect to said axle (31).

* * * * *